United States Patent [19]

Spikes

[11] Patent Number: 4,603,737
[45] Date of Patent: Aug. 5, 1986

[54] LINE PROTECTOR

[76] Inventor: Hugh D. Spikes, P.O. Drawer W, Weatherford, Tex. 76086

[21] Appl. No.: 770,434

[22] Filed: Aug. 29, 1985

[51] Int. Cl.⁴ ............................................. E21B 17/10
[52] U.S. Cl. .................................. 166/241; 166/65.1; 138/110; 174/47; 175/325
[58] Field of Search .............. 166/241, 65.1; 308/4 A; 174/47; 138/110

[56] References Cited

U.S. PATENT DOCUMENTS

| | | | |
|---|---|---|---|
| 2,829,190 | 4/1958 | Comlossy, Jr. | 166/65.1 |
| 3,171,889 | 3/1965 | McCarthy | 174/47 |
| 4,068,966 | 1/1978 | Johnson et al. | 174/47 |
| 4,337,969 | 7/1982 | Escaron et al. | 285/24 |
| 4,422,504 | 12/1983 | Moore | 166/241 |
| 4,531,582 | 7/1985 | Muse et al. | 166/241 |
| 4,543,998 | 10/1985 | Thomerson | 166/241 |

FOREIGN PATENT DOCUMENTS

| | | | |
|---|---|---|---|
| 2138056 | 10/1984 | United Kingdom | 166/241 |
| 859594 | 9/1981 | U.S.S.R. | 166/241 |

Primary Examiner—James A. Leppink
Assistant Examiner—Hoang C. Dang
Attorney, Agent, or Firm—Thomas M. Scofield

[57] ABSTRACT

Improvements in protectors operative to carry and protect small diameter tubing, pipe or cables which are attached externally to oil well production tubing to control down hole devices such as safety valves, pressure and temperature sensors, electrical pumps and the like; improvements in such control line protectors which also operate to centralize the tubing string; improvements in such control line protectors useable in protecting both barelines and incapsulated lines; improvements in such line protectors which are installed over the pipe or tubing couplings.

9 Claims, 7 Drawing Figures

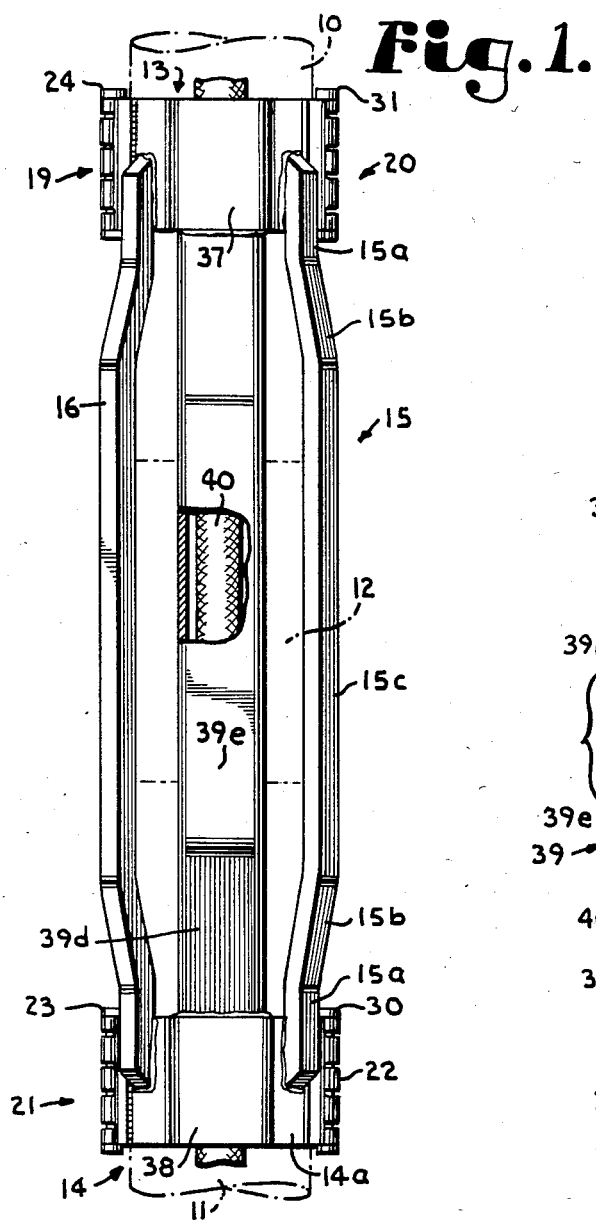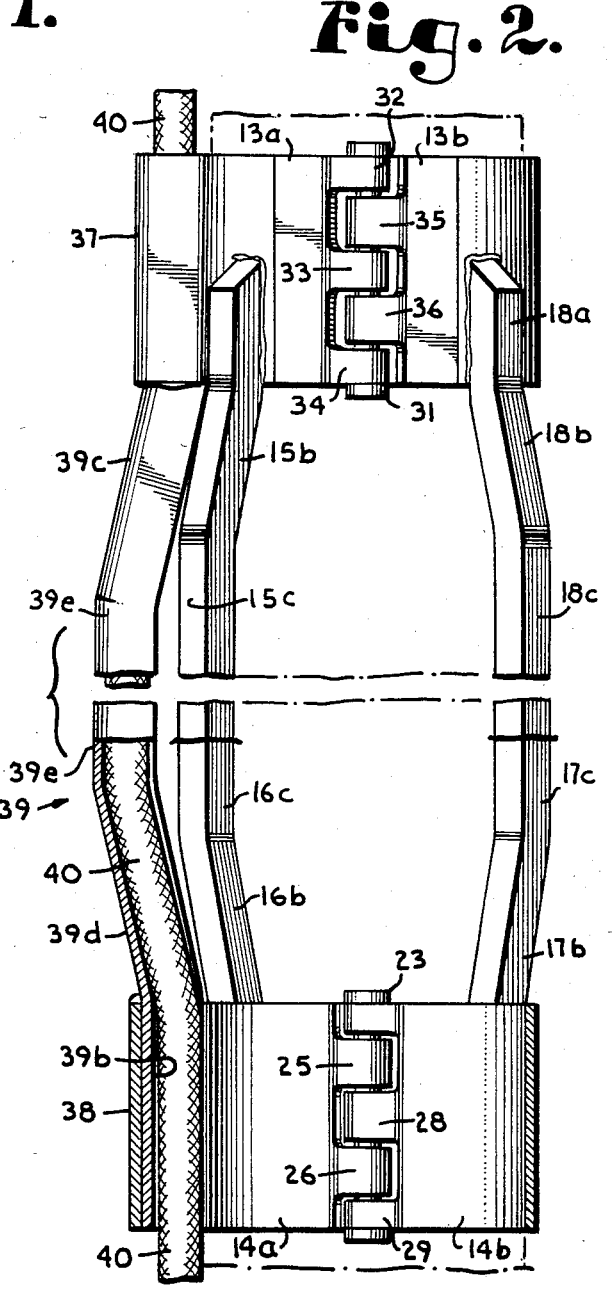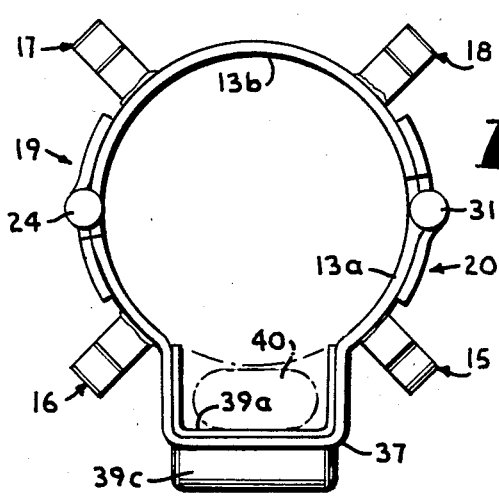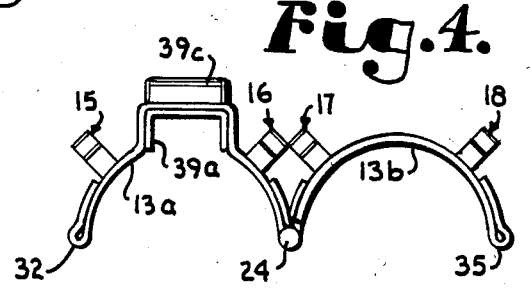

LINE PROTECTOR

BACKGROUND OF THE INVENTION

Metal control line protectors are well known. Such protectors were developed to carry and protect small diameter tubing, pipe or cables which are attached externally to production tubing to control down hole devices such as safety valves, pressure and temperature sensors, electrical pumps and the like. They are typically available in a full range of tubing sizes and can accept a variety of single or multiple control line configurations.

All control line protectors operate to prevent damage to electric and/or hydraulic control line at least in the portions thereof received within or captured by the protector. Most protectors also pretend to centralize the tubing string to a greater or lesser extent.

However, the prior art control line protectors, insofar as known, are all positioned on the well tubing between the couplings therefor. Such couplings between lengths of tubing are the portions of the pipe string of the greatest diameter. Accordingly, lines are desired to be maximally protected are not protected at their most vulnerable point by conventional devices.

OBJECTS OF THE INVENTION

A first object of the invention is to provide improvements in control line protectors which are operative to effectively prevent damage to electric and/or hydraulic control lines at their most vulnerable positions in the wellbore.

Another object of the invention is to provide improved control line protectors which operate to optimally and maximally centralize the tubing string.

A further object of the invention is to provide optimal protectors to receive, carry and protect small diameter tubings, pipes or cables which are attached externally to well production tubing to control down hole devices such as safety valves, pressure and temperature sensors, electrical pumps or the like.

Another object of the invention is to provide such control line protectors which fit over the coupling between tubing lengths of a string of pipe or tubing, effectively protecting the lines in such zones.

Yet another object of the invention is to provide such a control line protector wherein this tool has a crimping effect on the control lines going over the collar, thereby to support the lines from one tubing or pipe joint to the next throughout the entire string of pipe, whereby the entire weight of the line is not supported at only one point above the well.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 1 is a side view of an incapsulated line protector mounted on a tubing string at the point where a coupling joins two lengths of tubing. A part of the line protector portion, per se, is cut away to show the incapsulated line therewithin.

FIG. 2 is an enlarged view of the device of FIG. 1 taken from the right hand side of FIG. 1 looking left in the view of FIG. 1. The lower part of FIG. 2 is in section taken centrally through the device showing the inner portion of the device.

FIG. 3 is a top view of the device of FIG. 1 without showing the tubing or casing therewithin.

FIG. 4 is a view of the device of FIGS. 1-3 from the top with the device open around the hinge.

FIGS. 1-4, INCLUSIVE

Figure 5:
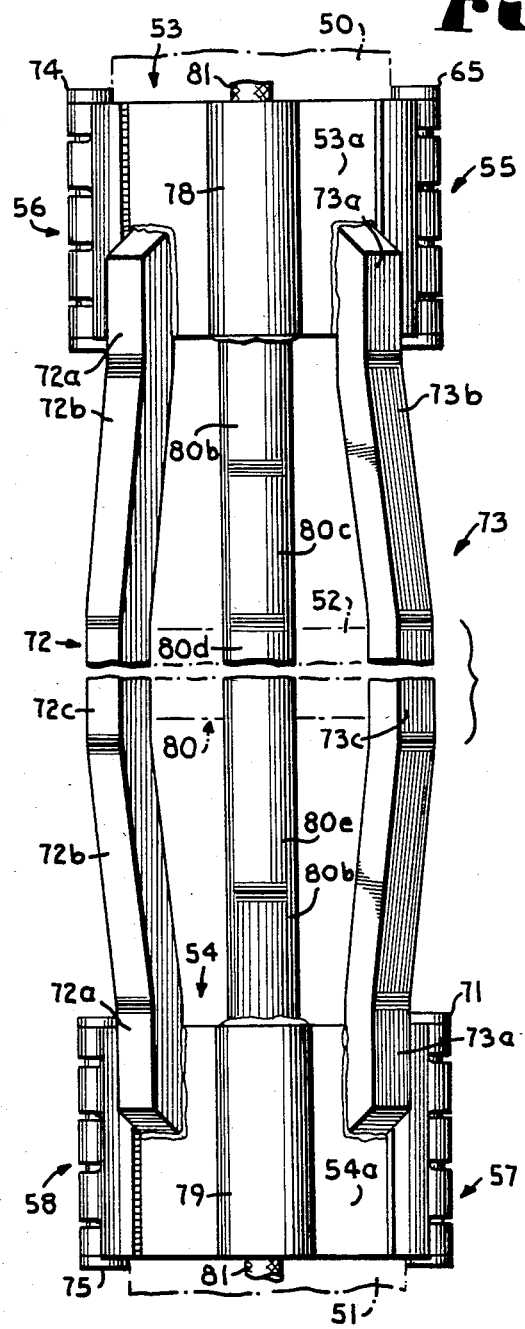
FIG. 5 is a side view of a bareline protector with the bareline protector channel in the center of the view.

Referring to FIGS. 1-4, inclusive, therein is seen a first, upper length 10 of pipe or tubing and a second, lower length 11 of pipe or tubing, such connected together by coupling or collar 12. Collar 12 is of greater diameter than either of the tubing lengths 10 and 11. The tubing lengths are threaded into the upper and lower ends of collar 12. The ends of pipe or tubing lengths 10 and 11 may be upset or of greater diameter at their end portions which thread into the joining collar but such is not the case in the tubing shown.

The subject device essentially resembles a centralizer with a channel for receiving and protecting one or more control lines, which centralizer device is adapted to fit over and around a collar on a pipe or tubing string. This line protector differs, however, from most centralizers in that the upper and lower collars 13 and 14 thereof are not connected together by resilient spring members. Instead, in the example shown, four rigid outwardly bowed members 15, 16, 17 and 18 are welded or otherwise fixedly attached to the collar members at substantially evenly spaced positions therearound. As will be described with respect to member 15 in FIG. 1, each connecting member 15-18, inclusive has straight base members 15a which are connected to the collars, outwardly angled portions 15b and elongate, substantially straight portions 15c. Portions 15c-18c are preferably slightly outwardly bowed. Each of the connecting members 15-18, in the example shown, are solid, whereby to maintain their rigidity except under the most extreme conditions.

Collars 13 and 14 each have two portions 13a and 13b and 14a and 14b. The halves of the collars 13a and 13b are joined together by two hinges generally designated 19 and 20. Likewise, the halves of lower collar 14a and 14b are joined together by two collars 21 and 22. Hinges 19 and 21 are each a hinge typically completed at the factory with the pins 23 and 24 there inserted and welded to one of the collar sections. Thus, in FIG. 2, collar section 14a has hinge elements 25 and 26 interlacing with hinge elements 27-29, inclusive of collar section 14b. These elements are engaged by pin 23.

On the other hand, pins 30 and 31 are generally inserted in the field when the protector in question is mounted on the tubing sections 10, 11 over collar 12. Thus, as seen in the top portion of FIG. 2, pin 31 engages hinge portions 32-34 of collar portion 13a and hinge portions 35 and 36 of collar portion 13b.

Collar portion 13a is outwardly formed at 37 in a rectangular cross section shape. In the example shown, this outward forming is of considerably greater depth and width than the depth and width of the members 15, 16, etc. Collar section 14a is likewise outwardly formed congruent and equally dimensioned as seen at 38. An elongate or U-section channel of configured form to be described, generally designated 39, fits within portions 37 and 38 at its upper and lower ends 39a (FIG. 3) and 39b (lower portion of FIG. 2). Portions 39a and 39b are welded or otherwise fixedly attached to the inside surfaces of collar portions 37 and 38 and are congruent therewith in shape. The elongate channel 39 additionally has outwardly angled portions 39c and 39d, as well as elongate straight or slightly outwardly bowed portion 39e. Incapsulated line assembly 40 is shown received within channel 39.

It should be understood that collar portions 13b and 14b may also be outwardly formed or offset between connecting members 17 and 18 in the case that a second or dual line protecting channel is desired. In such case collars 13b and 14b would be mirror images of collars 13a and 14a with a channel exactly like channel 39 received in the outwardly formed portions of collar 13b and 14b and extending therebetween in the manner of channel portions 39c, 39d and 39e.

In operation of the device, collars 13 and 14 are opened around hinges 19 and 21. The bare or incapsulated line is placed within the channel 39. The collars 13 and 14 are then closed around the lower portion of tubing 10 and the upper portion of tubing 11, thereby enclosing the collar 12 which connects together tubing sections 10 and 11 therebetween. The closure of the collars 13 and 14 with the line(s) (incapsulated or bare, single or plural) 40 therewithin on the tubing string over the collar has a slight crimping effect on the line or lines 40. Such crimping or engaging effect tends to support the line from one tubing joint to the next. This occurs throughout the entire string of pipe at each joint where one of the subject tools is employed. This causes the line 40 to be supported at each tool or protector so that the entire weight of the line is not supported at only one point above the well. Also, by covering and enclosing line(s) 40 at those points in the tubing string of greatest diameter, the incapsulated line or bare line 40 is protected at the point or points at which it is most vulnerable to damage, namely where there is least space between the outer tubing surface and the wellbore.

With respect to the device of FIGS. 1-4, inclusive, it should be understood that, if there is room in the well bore hole, then rigid bars will be employed entirely with the line protector tool. If there is limited room in the hole, then rigid bars will be employed, if possible, at least on each side of the line protector channel. The object of the rigid bars is to protect the line guard channel(s) against wear in a deep hole so that, in turn, the channel(s) may protect the line or lines carried therewithin. Thus, the device of FIGS. 1-4, inclusive shows a line protector to be used in a well bore of sufficient size to permit use of the circumferential rigid bars.

It is most desirable that the subject line protector tools be positioned at and over each pipe string, tubing string or the like joint. This is for two purposes. In the first place, it is necessary and desirable to protect the integrity of the line(s) at those zones of least well bore clearance. Secondly, it is desirable that the line(s) be engaged at each tool joint or pipe string joint in such manner that the length of line itself therebelow be supported at and from that joint. This remark applies to each well bore pipe string joint so that the line(s) support will be from joint to joint, rather than from the surface.

The control lines, in application to well bore tubing as it is being put together before going down hole, are typically fed from a tensioning unit at the surface. Thus, the line coming to the tubing lengths and successive line protector tools is straight and under some tension. By closing the subject devices on the tensioned, straight control line, whether bareline or incapsulated line, the length of the line received within the tool is formed to the outline of the channel. The gentle angles or gentle tapers in the line protector channel, while forming the line away from a straight into a configured line, also forms the line or lines to be protected in relatively gentle curvatures thereby effecting a mild crimping action within the channel against the pipe/tubing ends and coupling/collar connecting same within the tool. The thus formed or crimped line at a given tool offers support to the line below extending to the next line protector tool. And so on for the length of the tubing string.

FIGS. 5-7, INCLUSIVE

Figure 6:
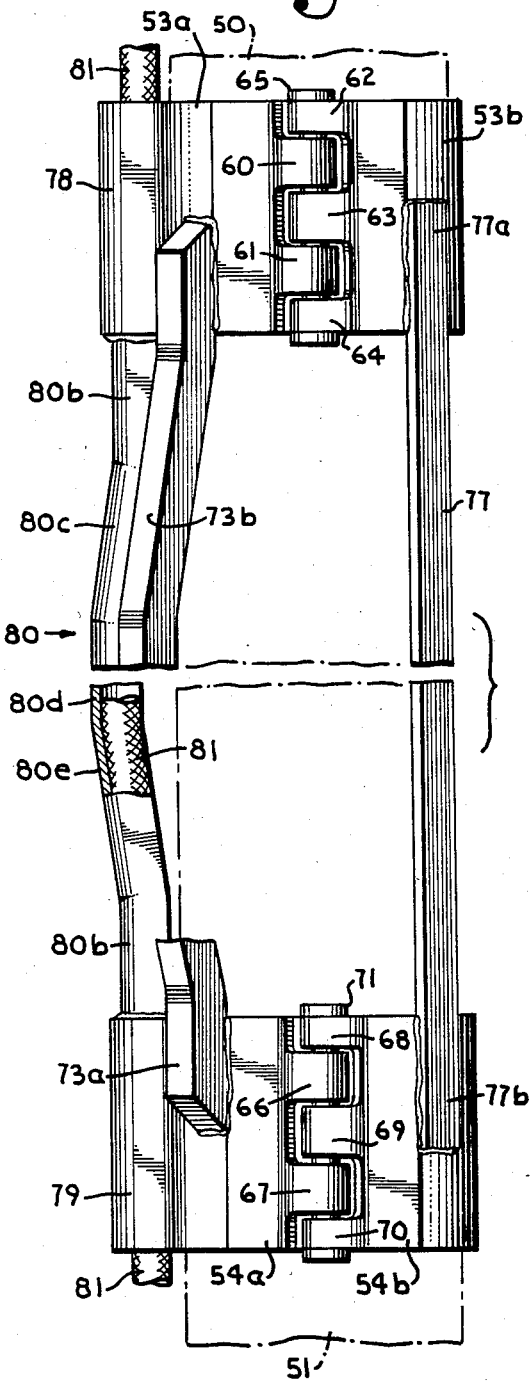
FIG. 6 is a view of the device of FIG. 5 taken at substantial right angles to the showing of FIG. 5, specifically, looking from right to left in the view of FIG. 5. In the lower part of the view parts are cut away to better illustrate the structure of the device.
Figure 7:
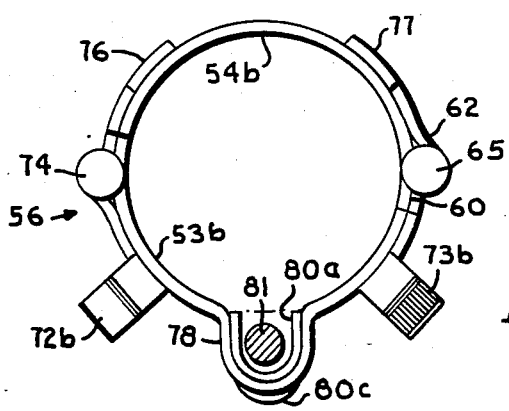
FIG. 7 is a top view of the device of FIG. 5.

The device of FIGS. 5-7, inclusive is presented to particularly illustrate two features in a line protector. First, the well bore into which the device of FIGS. 5-7, inclusive is to be placed or used is not of sufficient diameter to permit the use of circumferential rigid connectors or members analogous to members 15-18 of FIGS. 1-4, inclusive. This may also be expressed, in some circumstances, to the effect that there is a lack of space for the line to be protected and the tool in some hole sizes.

Secondly, the configuration of the line protector structure in the device of FIGS. 5-7, inclusive is that of a bareline protector. A bareline application of common type is a tubing which carries steam or water down to a certain level in the well bore. Alternatively, it may be but a single cable carrying therewithin means for one purpose or another or the like.

At any rate, then, referring to FIGS. 5-7, inclusive the lower end of the upper tubing is seen at 50. The upper end of the lower tubing is seen at 51. Because of the cut away of the central portions of the rigid collar connectors, the coupling or collar of the tubing string is indicated at 52 in FIG. 5. The upper collar is generally designated as 53 and has collar sections or halves 53a and 53b. The lower collar is generally designated 54 and has halves or sections 54a and 54b. Upper collar 53 has factory made hinge 55 and work area completion hinge 56. Likewise, collar 54 has factory completed hinge 57 and work area completed hinge 58.

Referring to FIG. 6, the upper hinge shown is 55. Tabs 60 and 61 from collar portion 53a interlace with tabs 62-64, inclusive from collar section 53b and are pinned together by pin or shaft 65.

Hinge 57 is seen in the lower right hand side of FIG. 6. Tabs 66 and 67 from collar half 54a engage with tabs 68-70, inclusive of collar half 54b and are hingedly fixed with respect thereto by pin 71.

Looking particularly at FIG. 5, two rigid connecting members (as well as spacing and protecting members) 72 and 73 are spaced apart on collar sections 53a and 54a and rigidly connected thereto by welding or other means. Each of members 72 and 73 typically have straight base members 72a, 73a outwardly angled portions 72b, 73b and elongate straight or slightly outwardly bowed portions 72c and 73c.

The hinges 56 and 58 are those closed in the area of work, typically at the well bore and have pins 74 and 75 to close the collars 53 and 54 upon a tubing string at the lower end of tubing 50, upper end of tubing 51 and enclosing coupling or collar 52 joining tubing lengths 50 and 51.

On the other side of the device, substantially opposed to members 72 and 73, are two flat elongate beam members 76 and 77. The ends of these flat elongate beams are welded or otherwise fixedly attached at their upper and lower ends 77a and 77b to collar portions 53b and 54b.

Collar portions 53a is outwardly formed at 78 in an arcuate manner, while collar portion 54 is outwardly formed in like arcuate manner at 79. An elongate channel generally designated 80 is welded or otherwise attached in recesses 78 and 79 with end portions thereof 80a (FIG. 7). Relatively straight portions 80b extend inboard from portions 80a, themselves connecting to outwardly angled portions 80c. Portions 80c connect to elongate, straight or very slightly outwardly bowed central portion 80d. Scalewise, the proportions and lengths of the rigid members of the device of FIG. 1 typically approach the proportions and lengths of the parts of the rigid members in the device of FIG. 5. Likewise, the center portion 80d of channel 80 in FIGS. 5 and 6 approaches the length of the center portion 39e of the channel 39 in FIGS. 1 and 2.

A cable, tube or bareline artifact 81 is seen received within the channel 80.

In operation of the device, collars 53 and 54 are opened around hinges 56 and 58. On tubing or pipe sections such as 50 and 51 being prepared to go into the wellbore, the bareline member 81 is placed within channel 80. Collars 53 and 54 are then closed around the lower portion of tubing 50 and the upper portion of tubing 51, respectively, thereby enclosing the coupling or collar 52 which connects together tubing sections 50 and 51.

The closure of collars 53 and 54 with the bareline member 81 in channel 80 over the ends of the tubing sections and the collar operates to provide a slight crimping or shaping effect on the line member 81. As may be seen in FIG. 6, line member 81 follows the configuration of the channel 80.

Such shaping of the bareline element 81 tends to cause the line 81 to support itself from one tubing joint to another. This occurs throughout the entire string of tubing at each collar or joint where one of the subject tools is employed. As a result of this, the line 81 is supported at each tool or protector. With such a multiplicity of support points, the entire weight or large portions of the weight of line 81 are not required to be suspended from the surface. Since line 81 is entirely covered by and enclosed within the channel 80 in the zone of the tubing string of greatest diameter, line 81 is protected at the wellbore zones or points where it is most vulnerable to damage.

Referring to the device of FIGS. 5-7, inclusive, it is understood that if the wellbore diameter was sufficient with respect to the protectors, then rigid bars (as in FIG. 1-4, inclusive) would be employed between collars 53 and 54 completely circumferentially thereof. However, because of limited space in the well bore annulus, only two rigid bars 72 and 73 are able to be employed on each side of the channel 80. Opposite channel 80 and on the other collar halves 53b and 54b the flat bars 26 and 27 are employed. In such case, the tubing string is not centered in the hole but is held off center by the rigid members 72 and 73.

Again, it is most desirable that line protector tools as in FIGS. 5-7, inclusive be positioned at and over each joint or coupling of the tubing string. That is, one such device should enclose each collar or coupling between the tubing or pipe elements. This is for the same purposes as with respect to the device of FIGS. 1-4, inclusive. In the first place, the integrity of the line 81 is best protected at the zone of least well bore clearance. Secondly, the engaging of line 81 at each tubing joint acts to support the line 81 at each such joint and thus carry the individual weight of each tubing length of line at the line protector tools thereabove. Tubing length is typically 33 feet.

The insertion of the line 81 into the well bore, in application with the well bore tubing going into the well typically involves feed from a tensioning unit at the surface. A line 81 coming along the pipe or tubing lengths and to successively applied line protector tools is thus, typically, straight and under some tension. In closing each successive line protector tool on the tensioned, straight control line 81 at each joint in the tubing string, that portion of the line 81 received within the line protector tools is formed or configured to the outline of channel 80. The configuration of channel 80 involves only relatively gentle or small angles or tapers. These configurations shape line 81 away from a straight to a configured line inside the tool. Such bonding is in relatively gentle curvatures, thereby effecting a mild shaping or crimping action within channel 80 against the pipe or tubing ends and coupling or collar connecting same within the tools. This shaping, as may be seen in FIG. 6, offers support to the line portion 81 therebelow extending to the next line protector tool.

With respect to the members which connect the upper and lower collars 13 and 14 or 53 and 54 in the subject line protectors, other than the channels 39 and 80, per se, considerable variations may be employed. As has been stated, it is most preferable that there be at least two rigid members associated with the line protector channel as is the case in FIGS. 5-7, inclusive. Most preferably, all of the collar connecting members such as members 15-18, inclusive in FIGS. 1-4, inclusive are outwardly bowed and extremely strong and rigid.

Where, as in FIGS. 5-7, inclusive, a pair of relatively resilient, flat beam members 76 and 77 are employed, such beam members must not be so rigid and heavy as to impede, hinder or prevent the connecting together of the collar halves 53a and 53b, 54a and 54b, etc. Thus, it is contemplated that members 76 and 77 bow outwardly somewhat over the coupling or collar connecting the tubing elements 50 and 51 together.

The subject invention contemplates that the following variations may be the case with respect to the line channels 39 and 80. First, all of the members connecting the three collars together may be the same as elements or members 76 and 77. Such flat members would offer minimal protection to the line channels and serve only to provide a minimum diameter to the apparatus or protector in question. The channel 80 or 39 is left most vulnerable to down hole contact as the string of tubing is moved into and out of the wellbore.

Alternatively, outwardly bowed spring members analogous to centralizer elements may be employed in the place of each member. These outwardly bowed spring members may be relatively flexible or relatively rigid, depending on the wellbore conditions. Combinations of flat beam members as at 76 and 77 and outwardly bowed spring members, the latter preferably on each side of the channel may be employed. In the place of the flat beam members 76 and 77 of FIGS. 5-7, inclusive, there may be employed two outwardly bowed spring members which would have a centralizing function but be more flexible and less rigid than members 72 and 73.

In short, the size and rigidity of the connecting members may be varied to accomodate the hole conditions. However, a first optimum and preferred form is to have at least two rigid members as seen in FIGS. 5-7, inclusive, such members positioned to optimally protect channel 80. Secondly, the most preferred form is to have rigid members employed entirely around the protector tool with at least two rigid members positioned one on each side of and protecting the channel 39 or 80.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A protector for down hole lines which are attached externally to well production tubing in a well bore, said tubing made up of lengths thereof connected together at intervals by coupling collars comprising, in combination:
   (1) a first collar encircling a tubing length adjacent the lower end thereof above a coupling collar,
   (2) a second collar encircling a second tubing length adjacent the upper end thereof below said coupling collar,
   (3) limited opposed portions of said collars axially outwardly formed the entire length of the collar,
   (4) an elongate channel for receiving a down hole line fixed at the upper and lower ends thereof to said collars in the outwardly formed portions thereof,
   (5) said channel outwardly formed at each end thereof adjacent said collars whereby to provide an elongate central length thereof operative to overlie said coupling collar and
   (6) a plurality of beam members connecting said collars together and spacing them apart positioned at intervals therearound,
   (7) at least two of said beam members being rigid, positioned one on each side of said channel and outwardly formed at each end thereof adjacent said collars, whereby to provide outwardly spaced elongate central portions thereof operative to overlie said coupling collar,
   (8) said rigid beam members operative to aid in protecting said channel on said tubing string in said well bore.

2. A protector as in claim 1 wherein there are at least four of said beam members, each of said beam members being rigid and outwardly formed at each end thereof adjacent said collars, whereby to provide outwardly spaced, elongate, central portions of each beam member.

3. A protector as in claim 1 wherein each said collar is made up of two 180° arcuate portions or halves hingedly connected together and the said channel is centrally received in outwardly formed portions of opposed halves of said collar, said outwardly formed portions formed substantially centrally of each of said opposed collar halves, a rigid beam member fixed to the collar halves receiving said channel being positioned on each side of the outwardly formed portions thereof.

4. A protector as in claim 1 wherein each collar is made up of two 180° halves hingedly connected to one another, there being four beam members connecting said collars together, two of said beam members connecting each set of opposed halves of said collars together.

5. A protector for down hole lines which are attached externally to well bore production tubing in a well bore, said tubing made up of lengths thereof connected together at intervals by coupling collars comprising, in combination:
   (1) a first collar adapted to encircle a tubing length adjacent the lower end thereof above a coupling collar,
   (2) a second collar adapted to encircle a second tubing length adjacent the upper end thereof below said coupling collar,
   (3) each said collar formed of two 180° segments or halves hingedly connected together at one end of each of said halves,
   (4) opposed central portions of opposed halves of each of said collars outwardly formed in their entire length axially of said collars,
   (5) an elongate channel for receiving a down hole line fixed at the upper and lower ends thereof to said outwardly formed collar segment portions inboard of said segments,
   (6) said channel outwardly formed adjacent to each connected end thereof whereby to provide an elongate central length thereof adapted to overlie said coupling collar in at least a portion thereof and
   (7) a plurality of beam members connecting each of said opposed collar segments together, one of said beam members positioned on each side of the outwardly formed portion of said one pair of collar segments,
   (8) at least said two beam members on each side of said channel being rigid and outwardly formed at each end thereof adjacent said collar segment whereby to provide outwardly spaced elongate central portions of said beam members,
   (9) said rigid beam members operative to aid in protecting said channel on said tubing string in said well bore.

6. A protector for downhole lines which are attached externally to well production tubing in a wellbore, said tubing made up of lengths thereof connected together at intervals by coupling collars comprising, in combination:
   (1) a first collar encircling a tubing length adjacent the lower end thereof above a coupling collar,
   (2) a second collar encircling a second tubing length adjacent the upper ends thereof below said coupling collar,
   (3) limited opposed portions of said collars axially outwardly formed the entire length of the collar, (4) an elongate channel for receiving a down hole line fixed at the upper and lower ends thereof to said collars in the outwardly formed portions thereof, (5) said channels outwardly formed on each end thereof adjacent said collars whereby to provide an elongate central length thereof operative to overlie said coupling collar and (6) a plurality of beam members connecting said collars together and spacing them apart positioned at intervals therearound.

7. A protector as in claim 6 wherein each said collar is made up of two 180° arcuate portions or halves hingedly connected together and the said channel is centrally received in outwardly formed portions of opposed halves of said collar, said outwardly formed portions formed substantially centrally of each of said opposed collar halves, a beam member fixed to the collar halves receiving said channels being positioned on each side of the outwardly formed portions thereof.

8. A protector as in claim 6 wherein each collar is made up of two 180° halves hingedly connected to one another, there being four beam members connecting said collars together, two of said beam members connecting each set of opposed halves of said collars together.

9. A protector for down hole lines which are attached externally to well bore production tubing in a wellbore, said tubing made up of lengths thereof connected together at intervals by coupling collars comprising, in combination:

(1) a first collar adapted to encircle a tubing length adjacent the lower end thereof above a coupling collar, (2) a second collar adapted to encircle a second tubing length adjacent the upper end thereof below said coupling collar, (3) each said collar formed of two 180° segments or halves hingedly connected together at one end of each of said halves, (4) opposed central portions of opposed halves of each of said collar outwardly formed in their entire length axially of said collars, (5) an elongate channel for receiving a down hole line fixed at the upper and lower ends thereof to said outwardly formed collar segment portions inboard of said segments, (6) said channel outwardly formed adjacent to each connected end thereof whereby to provide an elongate, central length thereof adapted to overlie said coupling collar in at least a portion thereof and (7) a plurality of beam members connecting each of said opposed collar segments together, one of said beam members positioned on each side of the outwardly formed portion of said one pair of collar segments.

* * * * *